United States Patent
Dalal

(10) Patent No.: US 9,087,074 B2
(45) Date of Patent: Jul. 21, 2015

(54) PROGRAM FLOW CONTROL MONITORING ROUTINES, RELATED METHODS AND SYSTEMS

(71) Applicant: Fisher Controls International LLC, Marshalltown, IA (US)

(72) Inventor: Mehul Dalal, Maharashtra (IN)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 197 days.

(21) Appl. No.: 13/685,463

(22) Filed: Nov. 26, 2012

(65) Prior Publication Data

US 2013/0145219 A1    Jun. 6, 2013

(30) Foreign Application Priority Data

Dec. 2, 2011   (IN) .......................... 3388/MUM/2011

(51) Int. Cl.
*G06F 11/30* (2006.01)
*G06F 11/07* (2006.01)
*G05B 19/042* (2006.01)

(52) U.S. Cl.
CPC .......... *G06F 11/302* (2013.01); *G05B 19/0428* (2013.01); *G06F 11/0715* (2013.01); *G06F 11/0736* (2013.01); *G06F 11/0748* (2013.01); *G06F 11/0757* (2013.01); *G06F 11/0775* (2013.01); *G06F 11/3072* (2013.01)

(58) Field of Classification Search
CPC . G06F 11/302; G06F 11/0715; G06F 11/736; G06F 11/3072; G06F 11/0757; G06F 11/0772; G06F 11/0793; G06F 11/2025; G06F 11/327
See application file for complete search history.

(56) References Cited

U.S. PATENT DOCUMENTS

| | | | | |
|---|---|---|---|---|
| 6,000,040 A | * | 12/1999 | Culley et al. ..................... | 714/31 |
| 6,414,594 B1 | | 7/2002 | Guerlain | |
| 6,725,398 B1 | * | 4/2004 | Varma et al. ..................... | 714/25 |
| 7,062,681 B2 | * | 6/2006 | Larsson et al. .................. | 714/39 |
| 7,689,873 B1 | * | 3/2010 | Bennett ........................... | 714/48 |
| 7,861,120 B2 | * | 12/2010 | Cui .............................. | 714/38.1 |
| 8,271,834 B2 | * | 9/2012 | Yildiz ............................ | 714/26 |
| 8,639,979 B2 | * | 1/2014 | Yildiz ............................ | 714/26 |
| 2003/0135781 A1 | | 7/2003 | Da Palma et al. | |
| 2004/0107387 A1 | * | 6/2004 | Larsson et al. .................. | 714/39 |
| 2005/0197805 A1 | | 9/2005 | Eryurek et al. | |
| 2009/0013208 A1 | * | 1/2009 | DiMuzio .......................... | 714/2 |
| 2010/0153768 A1 | * | 6/2010 | Yildiz ............................ | 714/2 |

FOREIGN PATENT DOCUMENTS

| | | |
|---|---|---|
| DE | 10 2007 015369 A1 | 7/2008 |
| DE | 10 2009 047724 A1 | 6/2011 |

(Continued)

OTHER PUBLICATIONS

Novak et al., "Safe commissioning and maintenance process for a safe fieldbus," Factory Communication Systems, WFCS, IEEE, 2008, pp. 225-232.

(Continued)

*Primary Examiner* — Nadeem Iqbal
(74) *Attorney, Agent, or Firm* — Marshall, Gerstein & Borun LLP

(57) ABSTRACT

The present disclosure relates to program flow control monitoring routines. In one embodiment, a process control apparatus is provided with a plurality of modules associated with control and/or monitoring of a given plant. Program flow control monitoring routines are provided to monitor the various modules.

20 Claims, 13 Drawing Sheets

(56) References Cited

FOREIGN PATENT DOCUMENTS

| EP | 1 650 661 A2 | 4/2006 |
| WO | WO-01/48608 A2 | 7/2001 |

OTHER PUBLICATIONS

Search Report for PCT/US2012/067009, mailed Feb. 13, 2013.
Written Opinion for PCT/US2012/067009, mailed Feb. 13, 2013.

* cited by examiner

| Function | Description |
|---|---|
| CMonitor_TimeMinMax | |
| Init() | RunTime Constructor. Initialize timing attributes m_ulMinTimeLimit and m_ulMaxTimeLimit before getting started to monitor |
| EnableMonitoring() | If enabled then timing parameter limit will be calculated to check limit exceeding otherwise no monitoring failure will be detected |
| IsWithinLimit() | limit). If limit exceeds then ret detected |
| TriggerTime() | Updates m_ulLastTrigger to save last execution time. Call this function whenever block of code which has been monitored is executed |
| CMonitorMgr | |
| Register() | Doubly Link list |
| Unregister() | Removes entry of CMonitor_TimeMinMax object from m_LIST_monitor CicularDiubly Link List |
| DoMonitoring() | Validate time limit by calling IsWithinLimit() starting from CMonitorMgr itself |

FIG. 7

PROGRAM FLOW CONTROL MONITORING ROUTINES, RELATED METHODS AND SYSTEMS

FIELD OF THE INVENTION

The present disclosure relates to program flow control for monitoring of software applications (referred to as "modules" herein) that are executed by various devices utilized throughout modern process and manufacturing plants. More specifically, the present disclosure relates to program flow control monitoring routines for use with the various modules to detect module errors and to take appropriate plant specific action.

BACKGROUND

Modern day processing and manufacturing plants utilize computer systems and microprocessor based monitoring and control systems in almost every facet of plant operations. The individual computer systems and microprocessor based monitoring and control systems store various modules that, when executed effectuate operation of various aspects of the plant. The specific function of any given module ranges from monitoring and controlling of individual plant field devices to facilitating operations and maintenance activity, to providing data for management reports.

Field devices that incorporate microprocessor based control routines have become commonplace. Often times, any given field device processor will sequentially execute several modules. The individual field devices often incorporate embedded systems. Any given embedded system stores and executes a variety of modules associated with specific plant monitoring and/or control functionality. For example, a given digital device controller may be configured to control a level in a tank. The controller may have an input from a tank level sensor and an output to a valve controller. The digital device controller executes a module, or modules, that control the output to open or close the valve as the level in the tank fluctuates above or below, respectively, a desired level. Any given field device, whether a sensor (i.e. level sensor) or an actuator (i.e. valve controller), may itself be a digital device designed to execute a module, or modules, that convert analog data to digital data, for example. Modules related to functions ranging from communications routines between the processor and an I/O port to routines for converting an analog value to a digital representation of the value are often times executed by any given field device processor.

Plant operations and maintenance computer systems often execute a plethora of modules as well. When operations and maintenance routines are executed on a corresponding processor, plant personnel are provided the ability to interact with individual plant devices. Additionally, plant management computer systems often execute a variety of modules. When management computer system routines are executed on a corresponding processor, plant personnel are provided operations data and related reports.

Known program flow control monitoring routines require up to an additional 2 MBytes of memory to store all the associated data. The required memory size depends on complete embedded firmware size and the number of modules that need to be monitored by the program flow control, in addition to the size of the program flow control module itself. The program flow control monitoring routines are module specific. Often times, memory is limited in embedded systems. Typically, program flow control modules decide the number of modules that need to be monitored before the corresponding starts execution. Once the number of modules to be monitored is determined, the corresponding memory allocation is set. Therefore, it has become desirable to provide a program flow control monitoring routine that requires little memory and that will monitor multiple modules.

SUMMARY

In one embodiment, a process plant monitoring and/or control apparatus includes a controller configured to receive at least one input and to generate at least one output. The process plant monitoring and/or control apparatus also includes a computer readable medium for storing at least one module. The program flow control monitoring routine of the present disclosure dynamically determines the number of modules to be monitored during run time and the corresponding memory allocation is increased or decreased accordingly. The controller is further configured to execute the module to effectuate monitoring and/or control functionality within a process. The process plant monitoring and/or control apparatus also includes a program flow control monitoring routine stored on the computer readable medium that, when executed detects any error related to the module and provides a time-stamp indication of when any error is detected. The program flow control monitoring routine includes an interface routine that is executed when any module error is detected and initiates a plant specific alert and/or action.

In another embodiment, a method of detecting errors in a module associated with process plant monitoring and/or control includes, providing a controller configured to receive at least one input and to generate at least one output. The method also includes providing a computer readable medium and storing at least one module and at least one program flow control monitoring routine. The method also includes executing the module to effectuate monitoring and/or control functionality within a process and executing the program flow control monitoring routine to detect any error related to execution of the module. The method also includes providing a time-stamp indication of when any module error is detected along with the amount of time the error related to any given module introduced and executing an interface routine when any module error is detected to initiate a plant specific alert and/or action.

In yet another embodiment, a computer readable medium for use in process plant monitoring and/or control includes at least one module associated with monitoring and/or control of a process stored on the computer readable medium and at least one program flow control monitoring routine stored on the computer readable medium. The program flow control monitoring routine is executed to detect any error related to the module and provides a time-stamp indication of when the error was detected. The computer readable medium also stores at least one interface routine that is executed when any module error is detected to initiate a plant specific alert and/or action.

BRIEF DESCRIPTION OF THE DRAWINGS

FIG. 7 contains Table 1 which explains functions associated with given class variables;

DETAILED DESCRIPTION

In one embodiment, an embedded system of a plant device stores and executes a plurality of modules related to various plant specific functionality. A program flow control monitoring routine is stored on a memory of the plant device that, when executed on a corresponding processor detects any error in the dynamically (e.g. run time related) registered modules being executed by the plant device. The program flow control monitoring routine includes a module registration routine, a module monitoring routine and an interface routine. The module registration routine dynamically at system run time registers and unregisters modules for monitoring in accordance with a user input. The module monitoring routine monitors registered modules for any errors and initiates execution of an interface routine when any module error is detected. The interface routine provides a plant specific alert and/or action. Thereby, a common module monitoring routine is used to monitor all registered modules. A program flow control monitoring routine having modular design as described enables the module monitoring routine to be reusable from module-to-module. Thereby, a program flow control monitoring routine is scalable in proportion to the number of modules registered for monitoring. This is particularly useful with embedded systems having limited memory and that store and execute a large number of modules.

A program flow control monitoring routine, when executed, performs any one of the following functions: module execution monitoring; interface for actions on module execution failure; module sequence monitoring; module sequence execution monitoring; interface for actions on module sequence execution failure; buffer overflow monitoring; interface for actions on buffer overflow; real time operating system (RTOS) thread monitoring; detect whether a thread is running on required time period; detect whether a thread is locking; detect whether a thread is running too fast or too slow; detect whether a module is running periodically as desired; interface for action on thread failure detection; any sub-combination or a combination thereof.

A module monitoring routine may be common to all modules being executed within a given plant system. Since plant system failure action is dependent on the given system in which a program flow control monitoring routine is implemented, a program flow control monitoring routine including an interface routine facilitates a common plant action upon detection of any module error.

Figure 1:
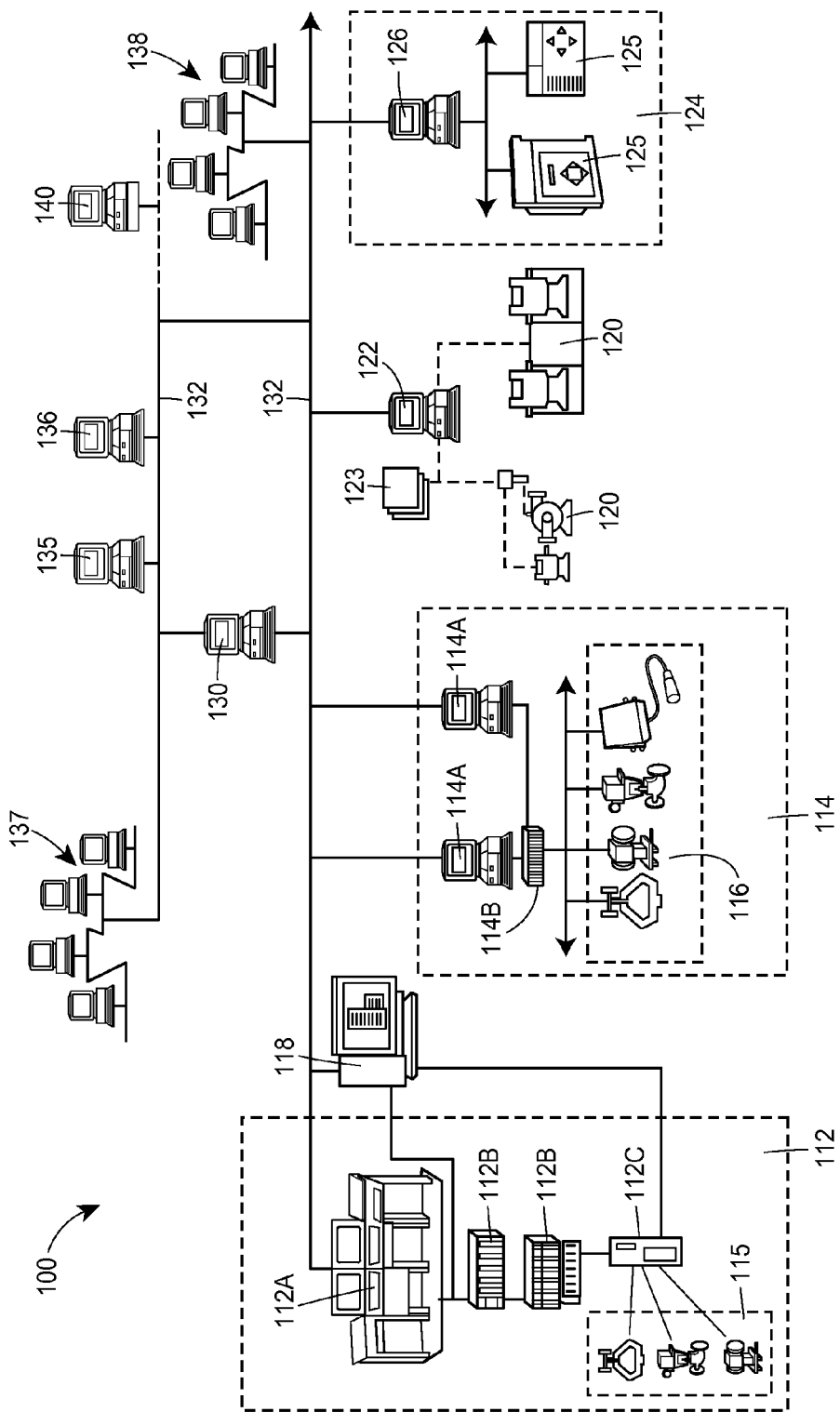
FIG. 1 depicts a block diagram of plant supervisory control and data acquisition system.

With reference now to FIG. 1, a plant SCADA system 100 is shown to include a number of business and other computer systems interconnected with a number of control and/or monitoring devices by one or more communication networks. As will be appreciated, the plant SCADA system 100 has a plethora of modules being executed by an equally staggering number of devices located throughout the plant.

The plant SCADA system 100 includes one or more process control systems 112 and 114. The process control system 112 may be a traditional process control system such as a PROVOX or RS3 system or any other DCS which includes an operator interface 112A coupled to a controller 112B and to input/output (I/O) cards 112C which, in turn, are coupled to various field devices such as analog and Highway Addressable Remote Transmitter (HART) field devices 115. The process control system 114, which may be a distributed process control system, includes one or more operator interfaces 114A coupled to one or more distributed controllers 114B via a bus, such as an Ethernet bus. The controllers 114B may be, for example, DeltaV™ controllers sold by Fisher-Rosemount Systems, Inc. of Austin, Tex. or any other desired type of controllers. The controllers 114B are connected via I/O devices to one or more field devices 116, such as for example, HART or Fieldbus field (FF) devices or any other smart or non-smart field devices including, for example, those that use any of the PROFIBUS®, WORLDFIP®, Device-Net®, AS-Interface and CAN protocols. A program flow control monitoring routine is compatible with HART, fieldbus, foundation fieldbus, PROFIBUS® and Modbus. As is known, the field devices 116 may provide analog or digital information to the controllers 114B related to process variables as well as to other device information. The operator interfaces 114A may store and execute modules available to the process control operator for controlling the operation of the process including, for example, control optimizers, diagnostic experts, neural networks, tuners, etc. Any given device within a process control system 112, 114 may comprise a number of modules stored on a corresponding memory and at least periodically executed by a corresponding processor. A program flow control monitoring routine may be incorporated within any given process control system module.

Maintenance systems, such as a computer 218 executing an asset management solutions (AMS) module or any other device monitoring and communication module may be connected to the process control systems 112 and 114 or to the individual field devices therein to perform maintenance and monitoring activities. For example, a maintenance computer 118 may be connected to the controller 112B and/or to the field devices 115 via any desired communication lines or networks (including wireless or handheld device networks) to communicate with and, in some instances, reconfigure or perform other maintenance activities on the field devices 115. Similarly, maintenance modules such as an AMS module may be installed in and executed by one or more of the user interfaces 114A associated with the distributed process control system 114 to perform maintenance and monitoring functions, including data collection related to the operating status of the field devices 116. Any given maintenance system may incorporate a program flow control monitoring routine.

The plant SCADA system 100 also includes various rotating equipment 120, such as turbines, motors, etc. which are connected to a maintenance computer 122 via some permanent or temporary communication link (such as a bus, a wireless communication system or hand held devices which are connected to the equipment 120 to take readings and are then removed). The maintenance computer 122 may store and execute known monitoring and diagnostic modules 123, for example RBMware™ sold by CSI Systems of Knoxville, Tenn. or any other known modules used to diagnose, monitor and optimize the operating state of the rotating equipment 120. Maintenance personnel usually use the modules 123 to maintain and oversee the performance of rotating equipment 120 to determine problems with the rotating equipment 120 and to determine when and if the rotating equipment 120 must be repaired or replaced. Anyone of the rotating equipment modules may incorporate a program flow control monitoring routine.

Plant SCADA system 100 also includes a power generation and distribution system 124 having power generating and distribution equipment 125 associated with the plant connected via, for example, a bus, to another computer 126 which runs and oversees the operation of the power generating and distribution equipment 125. The computer 126 may execute known power control and diagnostics modules 127 such as those provided by, for example, Liebert and ASCO or other companies to control and maintain the power generation and distribution equipment 125. A plurality of modules are stored and executed on the power generation and distribution equipment. Anyone of the power generation and distribution equipment modules may incorporate a program flow control monitoring routine.

A computer system 130 is provided which is communicatively connected to the computers or interfaces associated with the various functional systems within the process plant 100, including the process control functions 112 and 114, the maintenance functions such as those implemented in the computers 118, 114A, 122 and 126 and the business functions. In particular, the computer system 130 is communicatively connected to the traditional process control system 112 and to the maintenance interface 118 associated with that control system, is connected to the process control and/or maintenance interfaces 114A of the distributed process control system 114, is connected to the rotating equipment maintenance computer 122 and to the power generation and distribution computer 126, all via a bus 132. The bus 132 may use any desired or appropriate local area network (LAN) or wide area network (WAN) protocol to provide communications. As illustrated in FIG. 1, the computer 130 is also connected via the same or a different network bus 132 to business system computers and maintenance planning computers 135 and 136, which may execute, for example, enterprise resource planning (ERP) module, material resource planning (MRP) module, computer maintenance management systems (CMMS), accounting, production and customer ordering systems module, maintenance planning systems module or any other desired business modules such as parts, supplies and raw materials ordering modules, production scheduling modules, etc. The computer 130 may also be connected via, for example, the bus 132, to a plantwide LAN 137, a corporate WAN 138, as well as, to a computer system 140 that enables remote monitoring of, or communication within the plant from remote locations. Anyone of the computer system modules may incorporate a program flow control monitoring routine.

Figure 2:
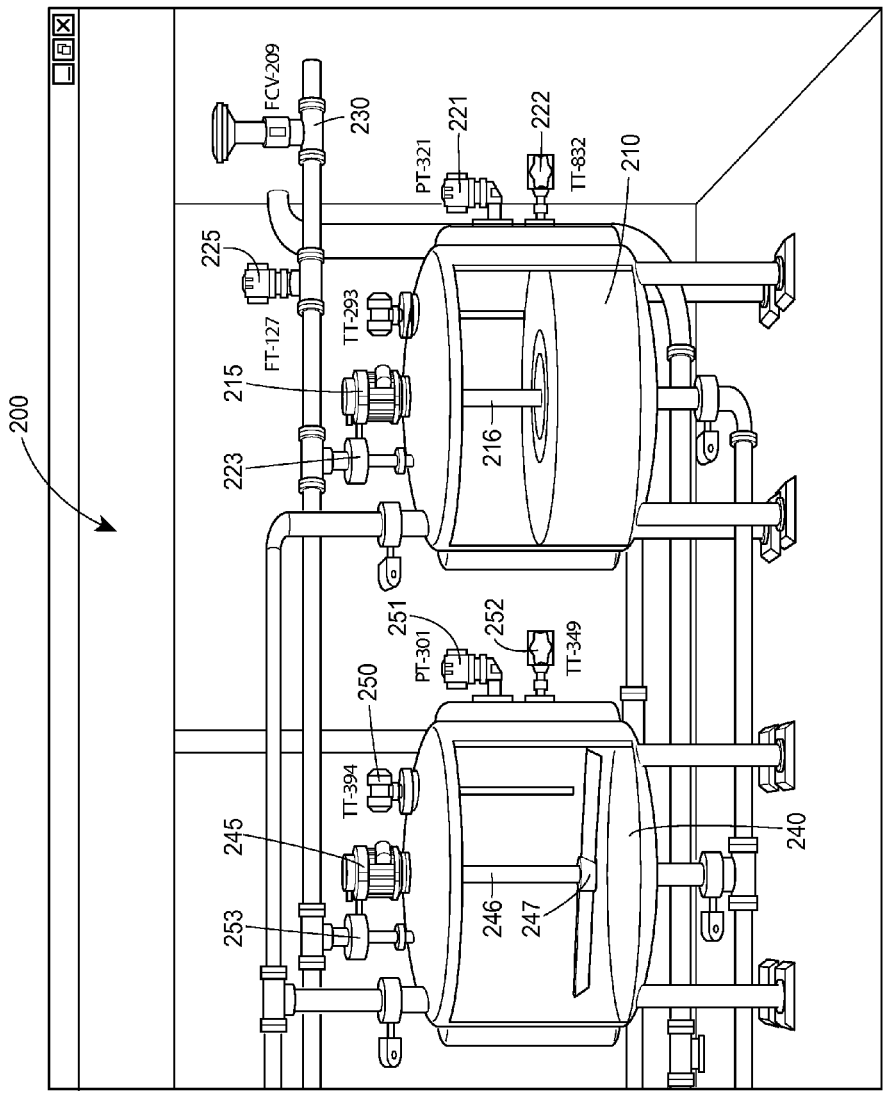
FIG. 2 depicts a layout drawing of an area within a process plant.

Providing further examples of various devices within a process plant that store and execute many modules, FIG. 2 depicts an exemplary graphical display 200 that may be provided by a graphical user interface (GUI) to report status information to a user and enable a user to quickly analyze the operational status and performance of a system within the plant. As depicted in FIG. 2, a given process may include electric motors, compressors, thermostats, valves, regulators, gearbox and other specific process related devices. The given plant system is depicted as having a pair of tanks 210, 240, a plurality of temperature transmitters 221, 251, pressure transmitters 222, 252, flow transmitters 223, 253, etc. and pipes, all of which may be interconnected as shown in FIG. 2. Any given digital device controller module may incorporate a program flow control monitoring routine in accordance with the present invention.

It should be understood that any given plant system may include field devices related to spray water, remote pumps, moving rail cars, rotating reactor, wellhead/heat exchangers, temperature profiling/tank level, gross production headers, combustion engine emissions, benzene tanks, turbine units, pump vibration, rotating lime kiln, plugged filter detection, safety showers, wellhead maintenance, mobile/temporary networks, refinery management, roll bearing, hot tanks, river water (environmental), steam cracker, treated water usage, filter condition, pipeline system, wellhead pressure, remote storage tanks, cold box, compressor air, mobile operator, compressor, steam lines, steam distribution lines, rotating alumina kiln, power industry applications, storage tank monitoring system, pipelines, manual valves, fuel supply systems, temporary installations, chamber walls, remote tanks, resin (batch) temperature, NOx emissions, mobile wellhead test system, filter plugging/vapor stream, heat transfer, control network bridging, air compressor, coking unit, gross oil production flow, blast furnace hearth, gas balance/wellheads and furnace temperature control. Any module related to the given monitoring and/or control device may incorporate a program flow control monitoring routine in accordance with the present invention. As yet further examples of plant related devices that store and execute various modules, FIGS. 3A-3D depict field devices associated with control of a plant. These devices may be configured to be actuated by an output from a digital device controller such as that depicted and described with reference to FIG. 5.

Figure 3A:
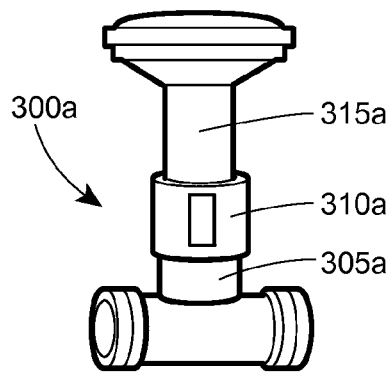
FIGS. 3A-3D depict various digital field device outputs.
Figure 3B:
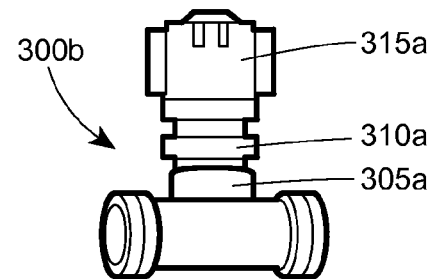
Figure 3C:
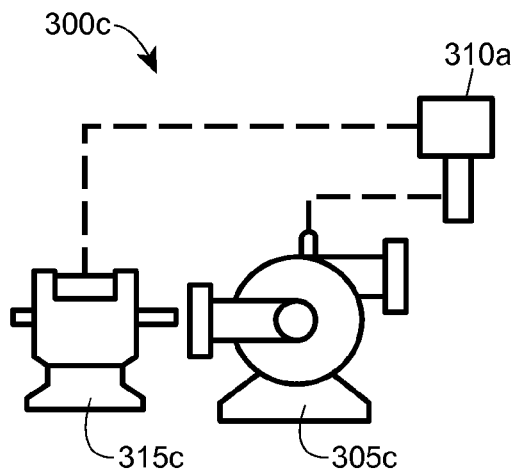
Figure 3D:
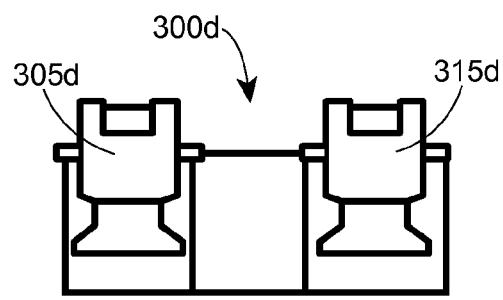

FIG. 3A depicts a field device 300a comprising a linear valve 305a, a digital valve controller 310a and a linear valve actuator 315a. FIG. 3B depicts a field device 300b comprising a rotary valve 305b, a digital valve controller 310b and a rotary valve actuator 315b. FIG. 3C depicts a field device 300c comprising a pump 305c, a digital motor/pump controller 310c and a motor (prime mover) 315c. FIG. 3D depicts a field device 300d comprising a first prime mover 305d, a digital prime mover controller (not shown) and a second prime mover 315d. It should be understood that any given field device may be configured as a process control actuator related to real-time operation of a plant. Any given plant control device module may incorporate a program flow control monitoring routine.

Figure 4A:
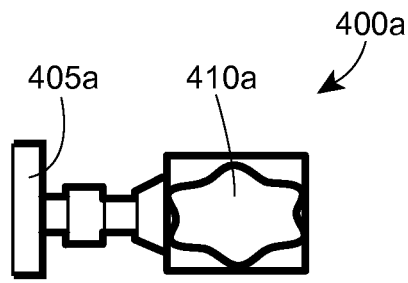
FIGS. 4A-4C depict various digital field device inputs.
Figure 4B:
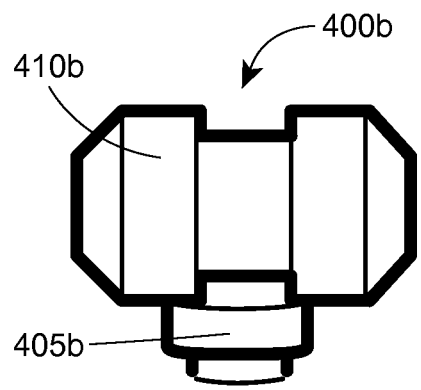
Figure 4C:
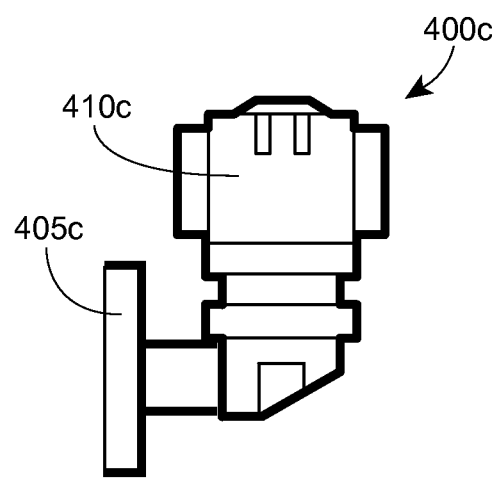

Yet, even further examples of process plant related devices that store and execute various modules, FIGS. 4A-4C depict field devices associated with monitoring of a plant. These devices may be configured to be monitored by an input of a digital device controller such as that depicted and described with reference to FIG. 5. FIG. 4A depicts a field device 400a comprising a temperature sensor 405a and a digital temperature monitor/controller 410a. FIG. 4B depicts a field device 400b comprising a level sensor 405a and a digital level monitor/controller 410b. FIG. 4C depicts a field device 400c comprising a Ph sensor 405c and a digital Ph monitor/controller 410c. It should be understood that any given field device may be configured as a process monitor/controller related to real-time operation of a process plant. Any given plant monitoring device module may incorporate a program flow control monitoring routine.

Figure 5:
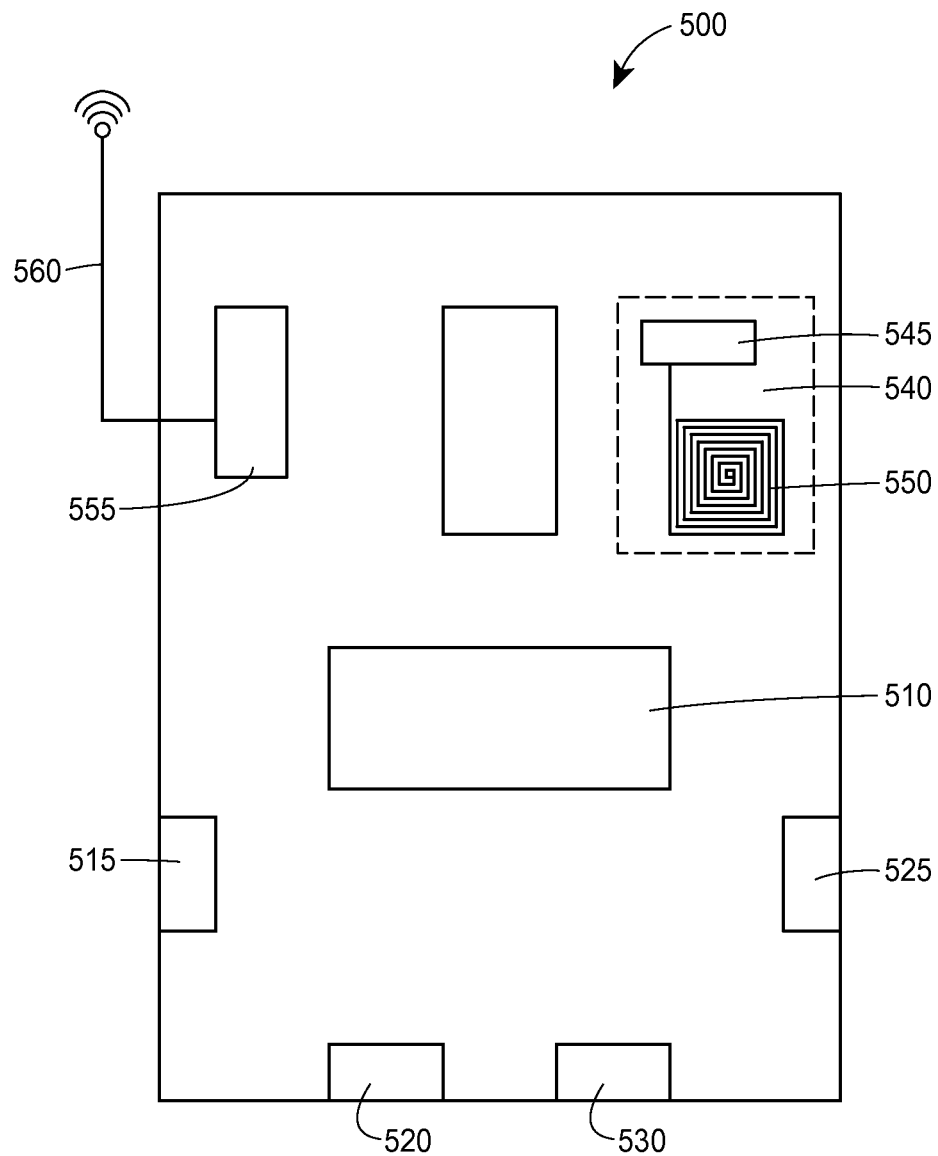
FIG. 5 depicts a block diagram of a digital field device.

With reference now to FIG. 5 there is shown a digital device controller 500. The digital device controller stores and executes a host of modules associated with control and/or monitoring of an associated field device. The digital device controller 500 includes a processor 510, a discrete input 515, an analog input 520, a discrete output 525, an analog output 530, a memory 535, a near field communications module 540, a far field communications device 555, and a far field communications antenna 560. The near field communications module 540 includes a digital circuit 545 and a near field communications antenna 550. Often times the processor 510, the memory 535 and a host of related modules for an embedded system. The program flow control monitoring routines described herein are particularly suited for embedded modules where low memory and high performance are desired. It should be understood that any given field device as depicted in FIGS. 3A-3D and 4A-4C may incorporate a digital device controller including an embedded system that executes a module that is monitored by a program flow control monitoring routine. As should now be appreciated, there are a plethora of individual modules stored and executed within various plant devices.

A program flow control monitoring routine may be designed as a run time module execution monitoring routine having module error detection with a time stamp. When written in C++, a program flow control monitoring routine is applicable to any module and is particularly useful with modules written in C++. When written in C++, a C-wrapper is available for actions on failure. Thereby, less memory overhead is needed, 32 Bytes per monitoring module. A corresponding program flow control monitoring routine does not need to use external memory (i.e. uses internal memory) to provide a time stamp.

A program flow control monitoring routine written in C++ may be implemented within a module itself. The given module may be designed to detect module errors and take action rather than depending on an external device/interface. A corresponding program flow control monitoring routine may be designed in an object oriented programming (OOP) concept. Thereby, modification of the monitoring mechanism is accomplished by adding/removing attributes of Monitor class. In at least one embodiment, a program flow control monitoring routine is designed in OOP, such that, it is reusable N number of times for different module execution monitoring. An interface routine which is communicating with other applications is provided with immediate response on execution failure.

Figure 6:
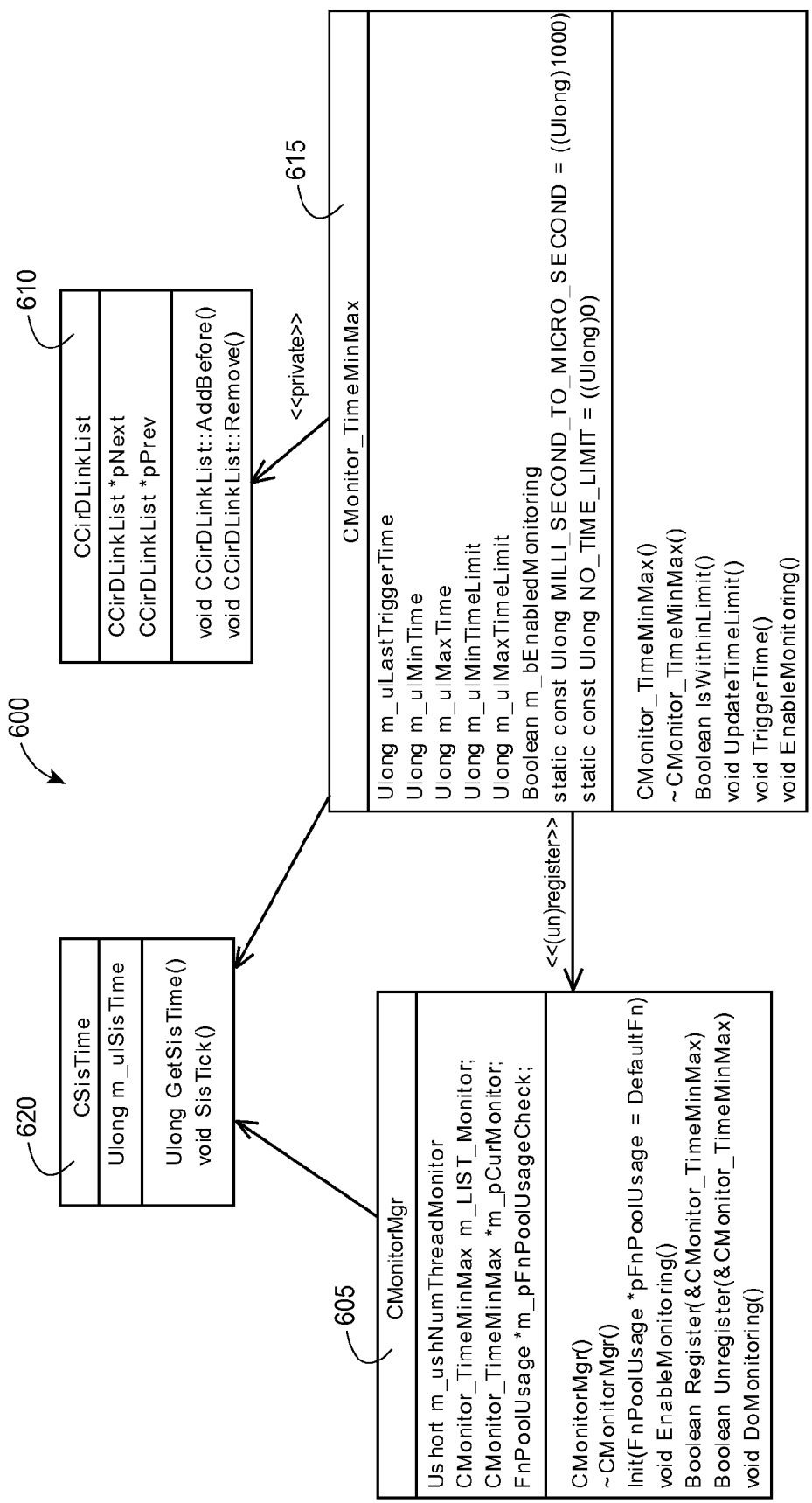
FIG. 6 depicts an OMD for Monitor Manager.

With reference to FIG. 6, a program flow control monitoring routine 600 includes a module monitor manager routine 605 and a list of modules to be monitored 610 by the module monitor manager routine 605. As depicted in FIG. 6, the routine CMonitorMgr uses the routine CCirDLinkList class to create a list of modules to be monitored. The routine CMonitorMgr is independent of real time operating system (RTOS) functionality. The routine CMonitorMgr does not use any RTOS API for getting information about monitored threads. Both the routine CMonitorMgr 605 and the routine CMonitor_TimeMinMax 615 use the routine CSisTime class 620 for updating a timestamp in each execution of the program flow control monitoring routine. The updated timestamp is associated with any detected module error.

Further reference to FIG. 6 and additional reference to Table 1, depicted as element 700, in FIG. 7, provides a description 710 of the functions 705 that are provided by the routine CMonitorMgr 605, 720 and the routine CMonitor_TimeMinMax class 615, 715. Until the routine CMonitor_TimeMinMax receives a first time update through the routine TriggerTime( ) 719, the variable m_bEnabledMonitoring 625 remains FALSE. After receiving a first time update, the variable m_ulLastTriggerTime will be updated and the variable m_bEnableMonitoring will be written to TRUE routine CMonitorMgr will check for a threshold time limit. If monitoring has not been enabled while check has been called from the routine CMonitorMgr, then no threshold time checking will be performed. The routine CMonitorMgr may be configured to run on a periodic time on an interrupt level or a thread level. Any module which is intended to be monitor by the routine CMonitorMgr will call Register( ) 721. This ultimately adds the module to the routine CMonitorMgr circular doubly linked list variable m_LIST_monitor 725. The program flow control monitoring routine of the present disclosure dynamically determines the number of modules to be monitored during run time and the corresponding memory allocation is increased or decreased accordingly.

Figure 8:
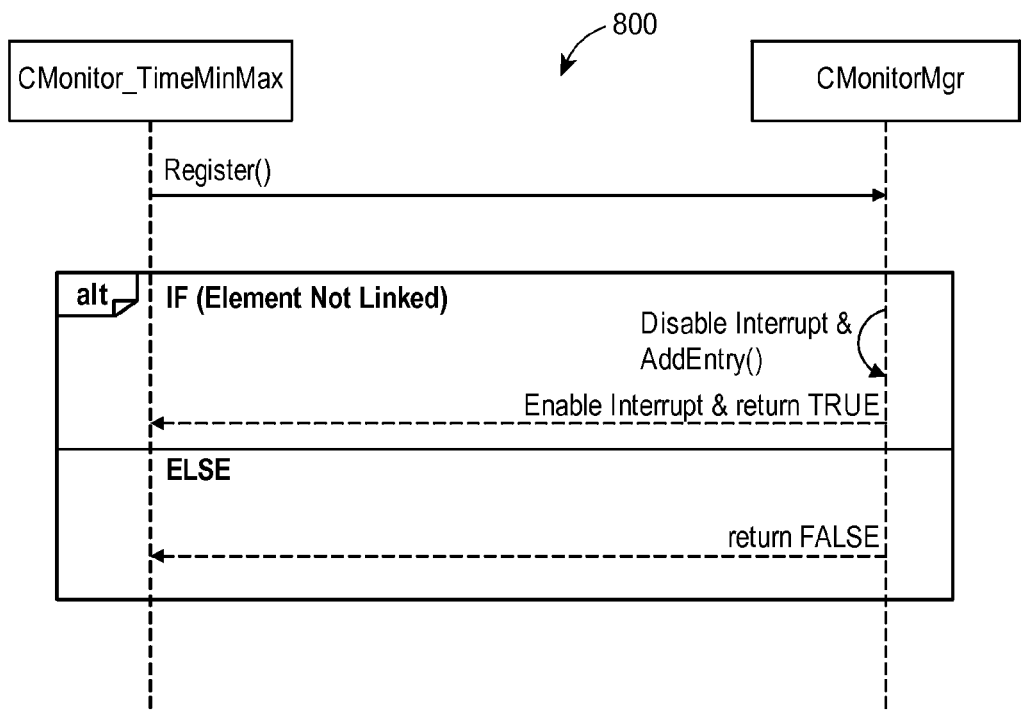
FIG. 8 depicts a sequence for registering a safety function/thread/functionality for monitoring.
Figure 9:
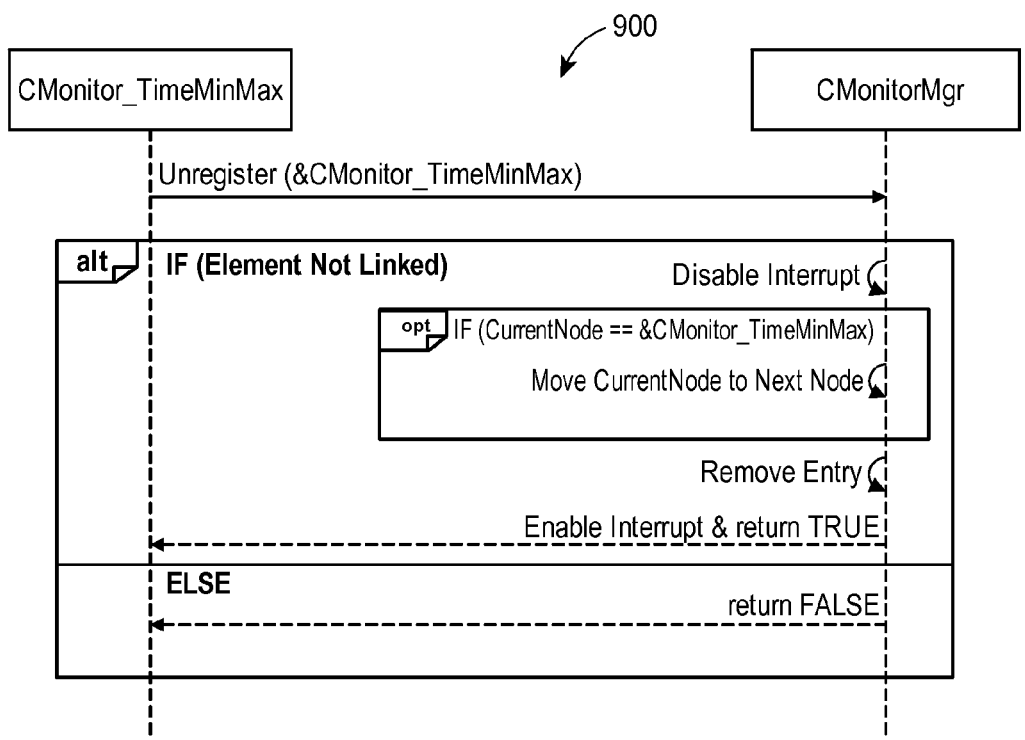
FIG. 9 depicts a sequence for unregistering a safety function/thread for removal from monitoring.

Any given module, thread or function may be registered for monitoring only once. If module registration is attempted a second time then the routine CMonitorMgr does not register it and returns a negative response for the received request. FIGS. 8 and 9 depict the sequence for registering 800 and unregistering 900 of monitoring from the routine CmonitorMgr, respectively. To remove a module, thread or function from the routine CMonitorMgr, the routine CMonitor_TimeMinMax object calls the routine Unregister( ) 722. If the module, thread or function is found in the routine CMonitorMgr for the received unregistering from monitoring, then the routine CMonitorMgr removes the module from the list and returns a positive response. If module, thread or function entry is not found while unregistering then routine CMonitorMgr will send a negative response for the received request.

Figure 10:
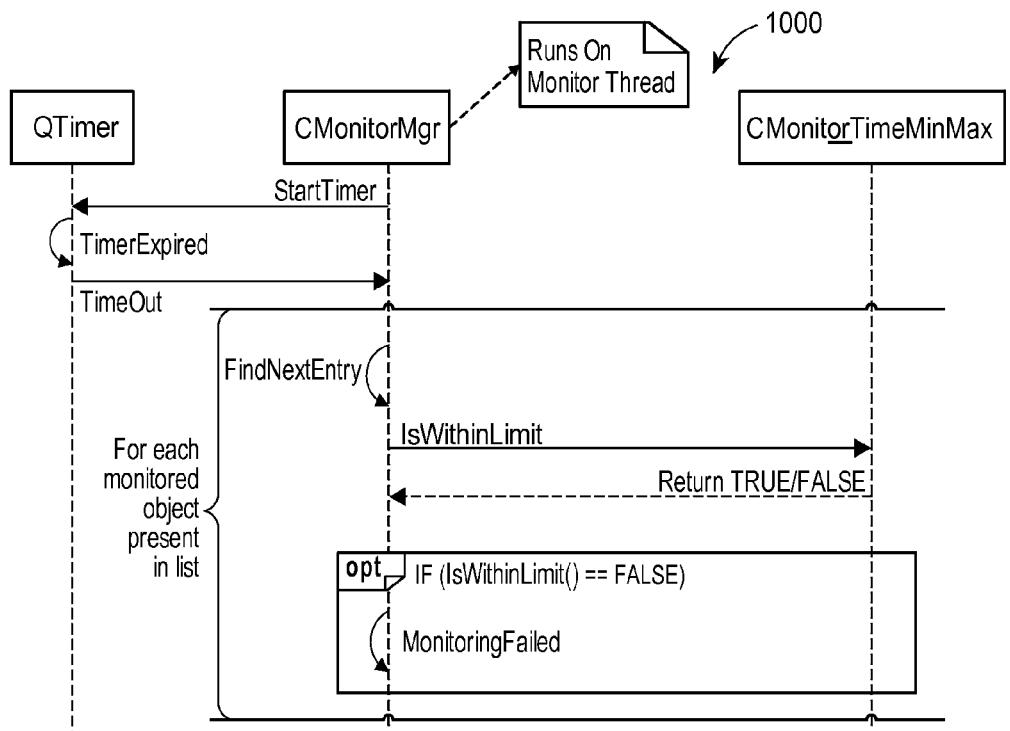
FIG. 10 depicts a sequence for safety function/thread/functionality.

FIG. 10 depicts a sequence diagram 1000 having details regarding execution of the routine CmonitorMgr class 1005. The program flow control monitoring routine, CmonitorMgr runs on a periodic schedule. This CmonitorMgr execution interval varies depending on system for micro-seconds to several seconds and may be configured at system run time. Using polling and/or interrupt timeout to run periodic checking of every module that is registered under the routine CMonitorMgr class. On receiving a timeout event 1010, the routine CMonitorMgr starts to monitor registered threads, functionality or modules.

Figure 11:
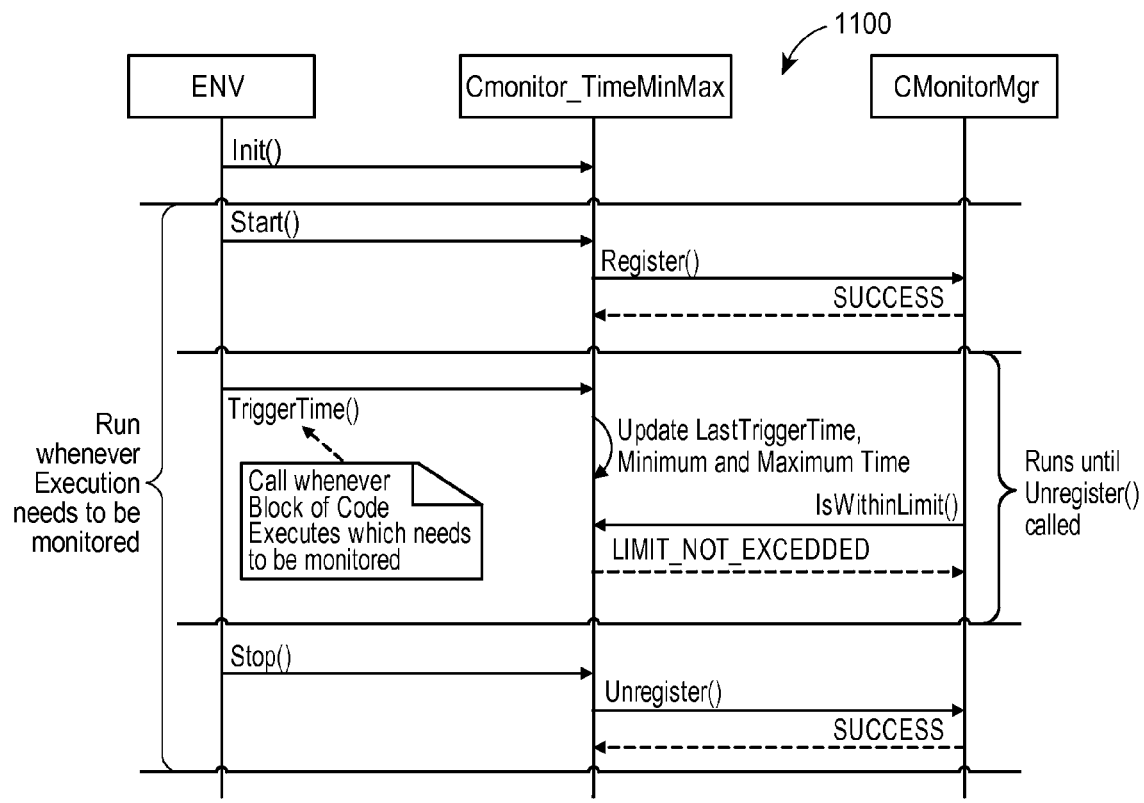
FIG. 11 depicts a sequence diagram explaining program flow control monitoring and initialization and use.

Program flow control monitoring routine execution 1100 is depicted in FIG. 11. If the "Limit" variable exceeds a configured maximum limit or falls below a configured minimum limit, then an interface routine, DevExecutionFailure( ), will be called and a plant specific alert and/or action is taken. The alert and/or action may be re-written by a device developer to impart a device specific action. When minimum limit checking is not required, m_ulMimTimeLimit will be set to NO_LIMIT_CHECK to specify that a lower limit is not going to be checked. Similarly this is applicable for maximum time limit.

Figure 12:
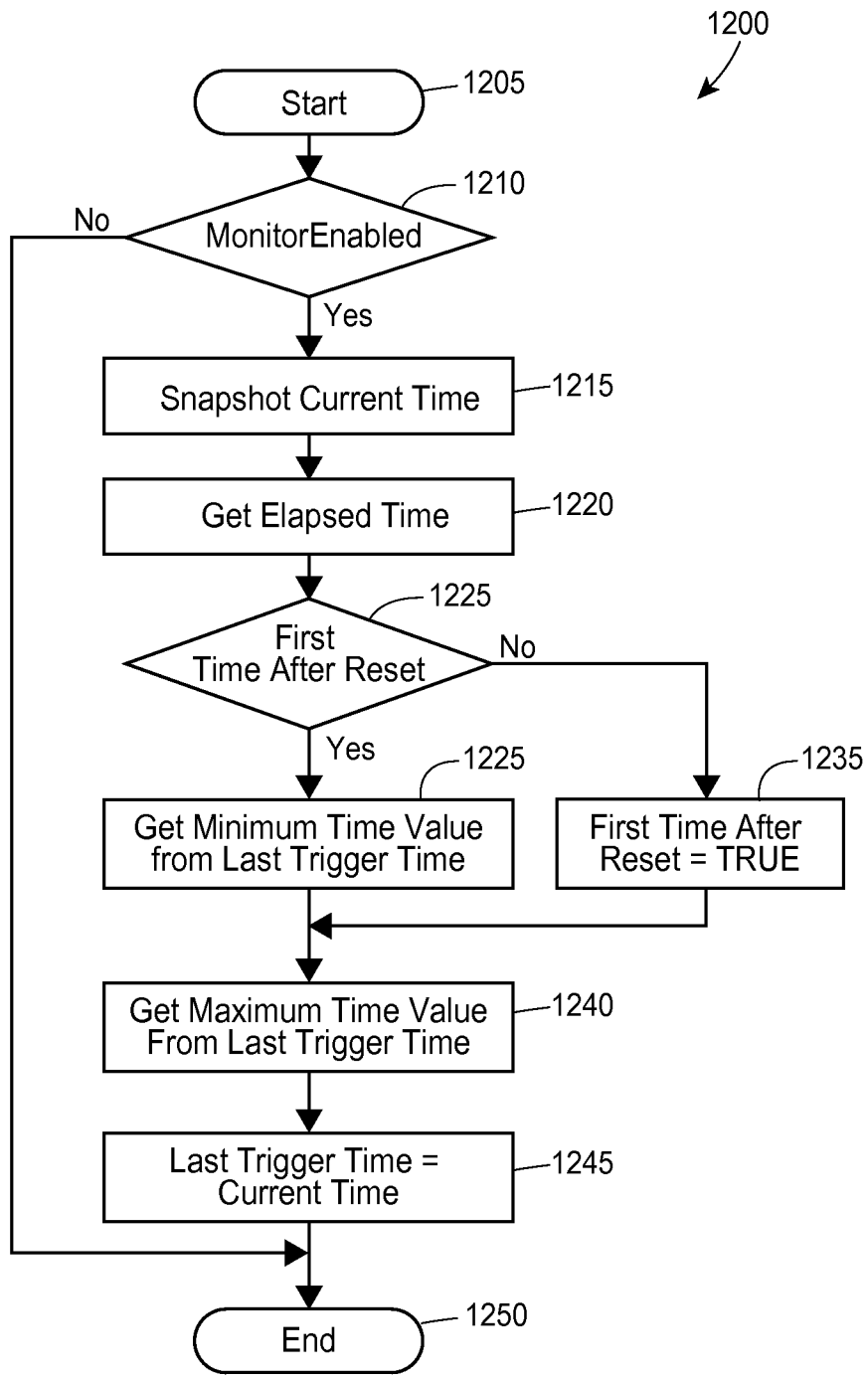
FIG. 12 depicts a flow chart for establishing a time for a given event.

FIG. 12 depicts a flow chart 1200 that outlines a routine that is executed when TriggerTime( ) class gets called from a given module which is being monitored. An interrupt based timer as depicted in the flow chart 1200 may be used to verify whether CMonitorMgr itself is executing correctly. The routine is initiated in start block 1205. A determination as to whether or not program flow control monitoring is enabled is performed in block 1210. If enabled, a snapshot of the current time is taken in block 1215 followed by calculating the elapsed time in block 1215. A determination is made in block 1225 whether this is the first execution since the routine was reset. If true, the minimum time value from the last trigger time is obtained in block 1230. If false, a designation of TRUE is assigned to a variable related to execution for the first time after reset in block 1235. Calculation of the maximum time value from the last trigger time is performed in block 1240 followed by setting the last trigger time equal to the current time in block 1245, before the routine is terminated in end block 1250. If CMonitorMgr itself is not executing, a safety function will be called to set the corresponding plant process in a safe state.

Figure 13:
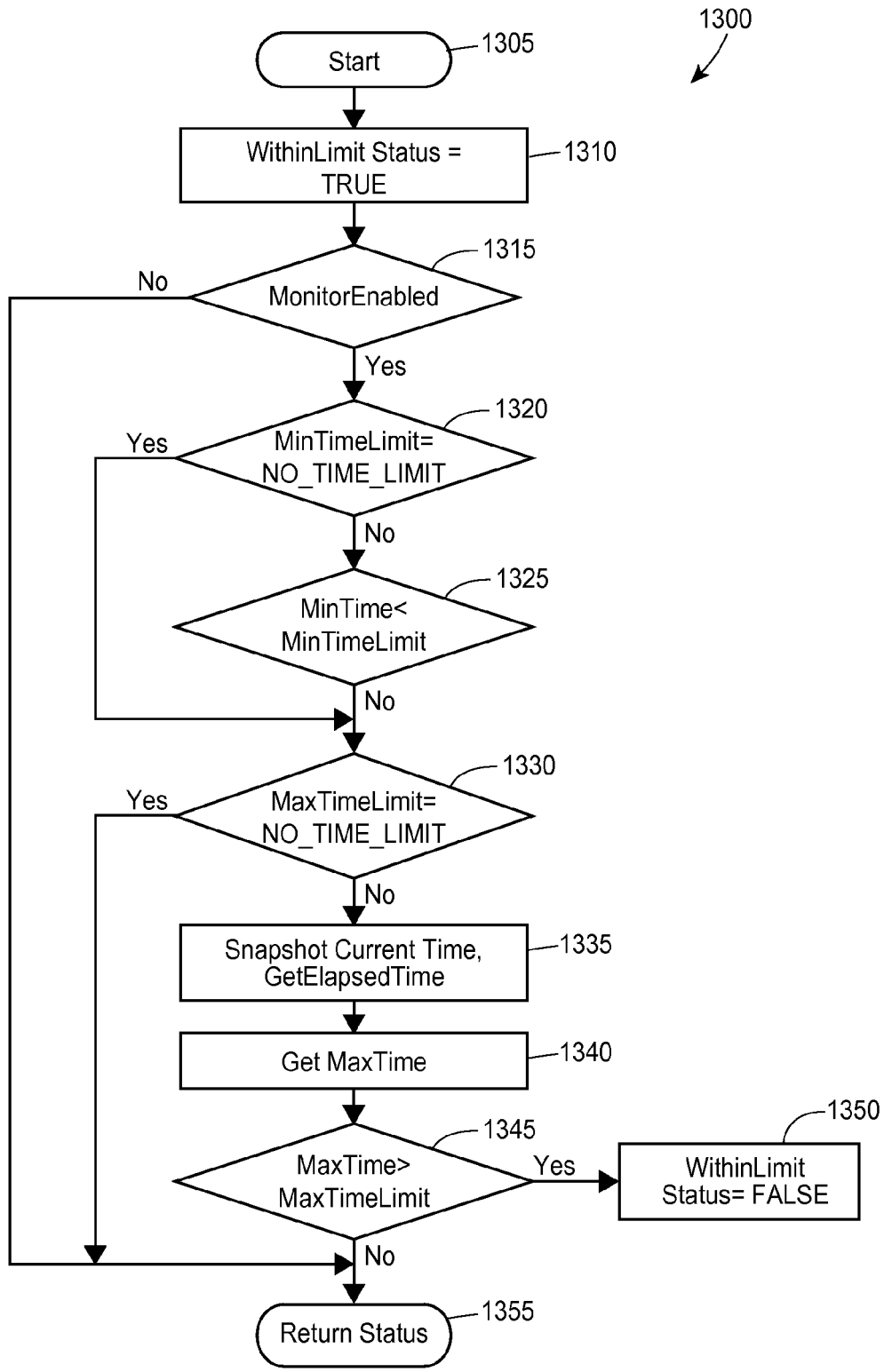
FIG. 13 depicts a flow chart for determining whether a given timer period is within a range.

FIG. 13 depicts a flow chart 1300 that outlines a routine that when executed determines whether, the module being monitored by the program flow control monitoring routine has an associated execution times within desired limits. The routine is initiated in start block 1305. A check is made as to whether the variable "WithinLimit Status" is equal TRUE in block 1310 followed by a check to see if monitoring is enabled in block 1315. If monitoring is not enabled, the routine proceeds to block 1355. If monitoring is enabled, a check is made as to whether the variable "MinTimeLimit" is equal to the variable "NO_TIME_LIMIT" in block 1320. If positive, the test to determine if the "MinTime" variable is less than the "MinTimeLimit" variable in block 1325 is performed. A check is made in block 1330 to determine if the "MaxTimeLimit" variable is equal to the "NO_TIME_LIMIT" variable. A snapshot of the current time is taken and the "GetElapsedTime" variable is computed in block 1335 followed by obtaining a "Maxtime" variable in block 1340. A determination is made in block 1345 as to whether the "MaxTime" variable is greater than the "MaxTimeLimit" variable. If true, a determination is made to see whether or not the "WitihinLimit" variable status is equal to FALSE. The status of the module being monitored is returned in block 1355. A corresponding module error status will be returned when the module execution time is out of the acceptable range.

Figure 14:
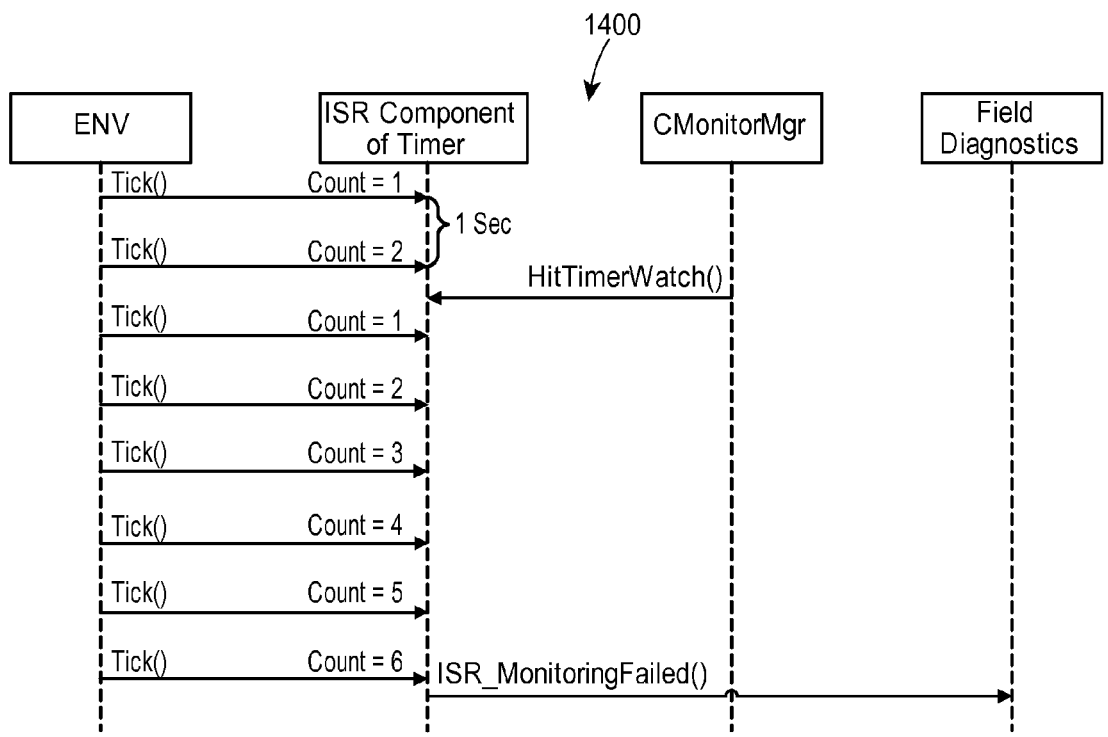
FIG. 14 depicts an execution sequence for monitoring whether a program flow control monitoring routine is operating as desired.

As depicted in the sequence diagram 1400 of FIG. 14, interface routine, DevExecutionFailure( ), will be executed on module failure for monitoring of functionality, threads or CMonitorMgr itself will generate an alert by default. This default action may be re-written by a device developer to have plant specific action, such as, turning off particular pieces of equipment.

Figure 15:
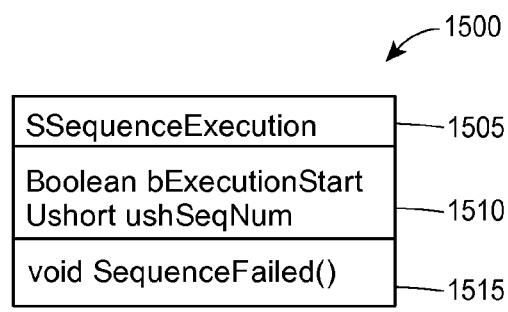
FIGS. 15 and 16 depict a routine for accommodating varying module execution sequences.
Figure 16:
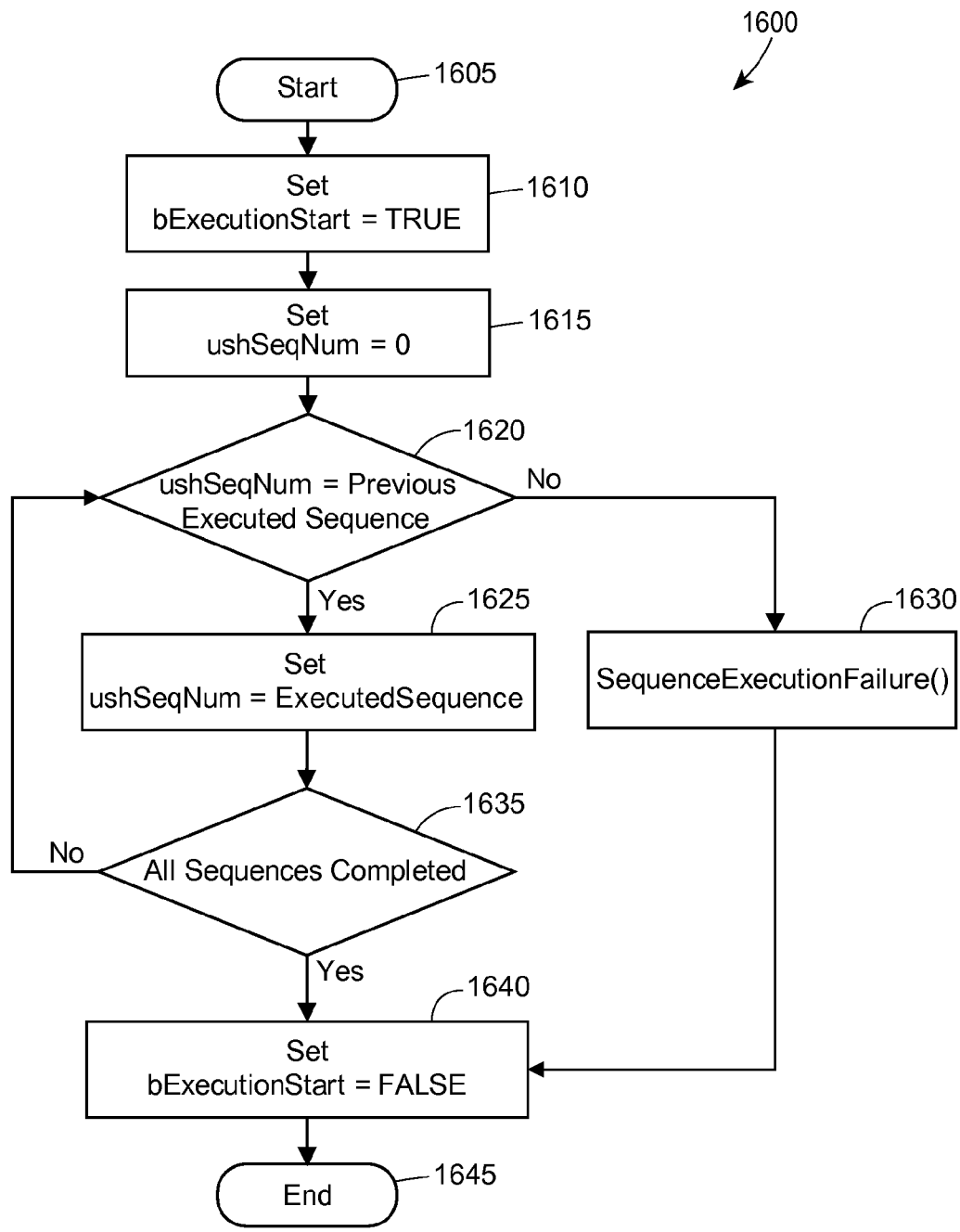

Often times, it is desirable to have safety functions executed in a predetermined sequence. Safety sequence execution is monitored as described with reference to FIGS. 15 and 16 and as depicted in sequence diagram 1500 and flow chart 1600. The variables "SSequenceExecution" 1505, Boolean "bExecutionStart", "Ushort", and "ushSeqNum" 1510 and void "SequenceFailed( )" 1515 are manipulated as depicted in FIG. 15. The safety sequence routine is initiated in start block 1605. The variable "bExecutionStart" is set to TRUE in block 1610 and the variable "ushSeqNum" is set to zero in block 1615. In block 1620 the "ushSeqNum" variable is checked to determine if it is equal to the previously executed sequence. If true, the "ushSeqNum" variable is set equal the "ExecutedSequence" variable in block 1625. If false the "SequenceExecutionFailure( )" variable is set in block 1630. A test is made in block 1635 as to whether all sequences have been completed. If the sequences are not completed, the routine returns to block 1620. If the sequences are completed, the "bExecutionStart" variable is set equal to FALSE in block 1640 before the routine is terminated in end block 1645.

Upon reading this disclosure, those of skill in the art will appreciate still additional alternative structural and functional designs for a program flow control monitoring routine. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the algorithm, method and apparatus disclosed herein without departing from the spirit and scope defined in the appended claims.

What is claimed is:

1. A process plant monitoring and/or control apparatus, comprising:
   a controller configured to receive at least one input and to generate at least one output;
   a computer readable medium for storing at least one module; said controller is further configured to execute said module to effectuate monitoring and/or control functionality within a process;
   a module registration routine stored on said computer readable medium that, when executed, dynamically, at system run time, registers and unregisters modules for monitoring in accordance with a user input; and
   a program flow control monitoring routine stored on said computer readable medium, said program flow control monitoring routine, when executed detects any error related to said module and provides a time-stamp indication of when any error is detected, said program flow control monitoring routine comprises an interface routine that is executed when any module error is detected and initiates a plant specific alert and/or action.

2. A process plant monitoring and/or control apparatus as in claim 1 wherein said program flow control monitoring routine provides error detection related to at least one of: program execution monitoring, run time operating system thread monitoring; program sequence monitoring; action on failure detection; a sub-combination thereof or a combination thereof.

3. A process plant monitoring and/or control apparatus as in claim 1 wherein said program flow control monitoring routine incorporates at least one of: a module independent design; a run time operating system independent design; a microprocessor independent design; a modular design; a scalable design; a reusable design; a sub-combination thereof or combination thereof.

4. A process plant monitoring and/or control apparatus as in claim 1 wherein said program flow control monitoring routine provides interrupt and/or polling based error detection.

5. A process plant monitoring and/or control apparatus as in claim 1 wherein said program flow control monitoring routine requires less than 32 Bytes of memory per module monitored and is configured to monitor a plurality of modules stored on a common memory and executed by a single processor.

6. A process plant monitoring and/or control apparatus as in claim 1 wherein said program flow control monitoring routine is written in C++ and utilizes the C wrapper for actions on failure.

7. A process plant monitoring and/or control apparatus as in claim 1 wherein said program flow control monitoring routine is incorporated into said module.

8. A method of detecting errors in a module associated with process plant monitoring and/or control, comprising:
   providing a controller configured to receive at least one input and to generate at least one output;
   providing a computer readable medium;
   storing at least one module, a module registration routine, and at least one program flow control monitoring routine on said computer readable medium;
   executing said module registration routine to dynamically register at least one module for monitoring in accordance with a user input, wherein the user input is indicative of a user desire to monitor program flow control for said at least one module;
   executing said module to effectuate monitoring and/or control functionality within a process;

executing said program flow control monitoring routine to detect any error related to execution of said at least one registered module;

providing a time-stamp indication of when any module error is detected; and executing an interface routine when any module error is detected to initiate a plant specific alert and/or action.

9. A method of detecting errors in a module associated with process plant monitoring and/or control as in claim 8 wherein said program flow control monitoring routine provides error detection related to at least one of: program execution monitoring, run time operating system thread monitoring; program sequence monitoring; action on failure detection; a sub-combination thereof or a combination thereof.

10. A method of detecting errors in a module associated with process plant monitoring and/or control as in claim 8 wherein said program flow control monitoring routine incorporates at least one of: a module independent design; a run time operating system independent design; a microprocessor independent design; a modular design; a scalable design; a reusable design; a sub-combination thereof or combination thereof.

11. A method of detecting errors in a module associated with process plant monitoring and/or control as in claim 8 wherein said program flow control monitoring routine provides interrupt and/or polling based error detection.

12. A method of detecting errors in a module associated with process plant monitoring and/or control as in claim 8 wherein said program flow control monitoring routine requires less than 32 Bytes of memory per module monitored and is configured to monitor a plurality of modules stored on a common memory and executed by a single processor.

13. A method of detecting errors in a module associated with process plant monitoring and/or control as in claim 8 wherein said program flow control monitoring routine is written in C++ and utilizes the C wrapper for actions on failure.

14. A method of detecting errors in a module associated with process plant monitoring and/or control as in claim 8 wherein said program flow control monitoring routine is incorporated into said module.

15. A non-transitory computer readable medium for use in process plant monitoring and/or control, comprising:

plurality of modules associated with monitoring and/or control of a process stored on said computer readable medium;

a module registration routine stored on said computer readable medium that, when executed, unregisters at least one module from being monitored in accordance with a user input;

at least one program flow control monitoring routine stored on said computer readable medium that, when executed, detects any error related to at least one module that is registered to be monitored and provides a time-stamp indication of when said error was detected; and at least one interface routine that is executed when any module error is detected to initiate a plant specific alert and/or action.

16. A non-transitory computer readable medium for use in process plant monitoring and/or control as in claim 15 wherein said program flow control monitoring routine provides error detection related to at least one of: program execution monitoring, run time operating system thread monitoring; program sequence monitoring; action on failure detection; a sub-combination thereof or a combination thereof.

17. A non-transitory computer readable medium for use in process plant monitoring and/or control as in claim 15 wherein said program flow control monitoring routine incorporates at least one of: a module independent design; a run time operating system independent design; a microprocessor independent design; a modular design; a scalable design; a reusable design; a sub-combination thereof or combination thereof.

18. A non-transitory computer readable medium for use in process plant monitoring and/or control as in claim 15 wherein said program flow control monitoring routine provides interrupt and/or polling based error detection.

19. A non-transitory computer readable medium for use in process plant monitoring and/or control as in claim 15 wherein said program flow control monitoring routine requires less than 32 Bytes of memory per module monitored and is configured to monitor a plurality of modules stored on a common memory and executed by a single processor.

20. A non-transitory computer readable medium for use in process plant monitoring and/or control as in claim 15 wherein said program flow control monitoring routine is written in C++ and utilizes the C wrapper for actions on failure.

\* \* \* \* \*